United States Patent
Edvinsson et al.

(10) Patent No.: US 12,344,464 B2
(45) Date of Patent: Jul. 1, 2025

(54) TEMPERATURE-CONTROLLED TRANSPORT CONTAINER AND A METHOD FOR CONTROLLING CONDITIONS IN SUCH CONTAINER

(71) Applicant: ENVIROTAINER ENGINEERING AB, Sollentuna (SE)

(72) Inventors: Lars Edvinsson, Uppsala (SE); Sebastian Johansson, Uppsala (SE)

(73) Assignee: ENVIROTAINER ENGINEERING AB, Sollentuna (SE)

( * ) Notice: Subject to any disclaimer, the term of this patent is extended or adjusted under 35 U.S.C. 154(b) by 219 days.

(21) Appl. No.: 18/029,454

(22) PCT Filed: Sep. 29, 2021

(86) PCT No.: PCT/SE2021/050956
§ 371 (c)(1),
(2) Date: Mar. 30, 2023

(87) PCT Pub. No.: WO2022/071859
PCT Pub. Date: Apr. 7, 2022

(65) Prior Publication Data
US 2023/0356927 A1    Nov. 9, 2023

(30) Foreign Application Priority Data
Oct. 2, 2020    (SE) .................................... 2051167-1

(51) Int. Cl.
*B65D 88/74*    (2006.01)
*B60H 1/00*    (2006.01)
(Continued)

(52) U.S. Cl.
CPC ....... *B65D 88/744* (2013.01); *B60H 1/00014* (2013.01); *B65D 88/747* (2013.01);
(Continued)

(58) Field of Classification Search
CPC .. B65D 88/744; B65D 88/474; B65D 88/745; B65D 88/14; B65D 88/24;
(Continued)

(56) References Cited

U.S. PATENT DOCUMENTS 2,881,600 A * 4/1959 Elfving ................. F25D 11/003
                                                          62/239
4,979,431 A * 12/1990 Fujimoto ................ F25D 21/08
                                                           454/91
(Continued)

FOREIGN PATENT DOCUMENTS

CN    203020155 U * 6/2013 ............. F25D 17/08
FR    2692234 A1    12/1993
(Continued)

OTHER PUBLICATIONS

Swedish Search Report for Application No. 2051167-1 dated May 10, 2021.
(Continued)

*Primary Examiner* — Emmanuel E Duke
(74) *Attorney, Agent, or Firm* — MOSER TABOADA

(57) ABSTRACT

A temperature-controlled transport container (10) has a cargo space (1) for accommodating temperature-sensitive goods and a refrigeration system. The refrigeration system comprises a closed air circuit (2), separate from the cargo space and located outside of and contiguous with at least one wall (9) of the cargo space. The refrigeration system further comprises at least one refrigeration unit (5) configured to cool air in the closed air circuit. The refrigeration system also comprises a pressurizing unit (8) for establishing a pressure difference between the closed air circuit and the ambient environment (20) outside of, but in a vicinity of, the temperature-controlled transport container.

20 Claims, 6 Drawing Sheets

(51) Int. Cl.
*F25D 11/00* (2006.01)
*F25D 17/08* (2006.01)

(52) U.S. Cl.
CPC ............ *F25D 11/003* (2013.01); *F25D 17/08* (2013.01); *B65D 2588/74* (2013.01); *F25D 2700/00* (2013.01)

(58) Field of Classification Search
CPC .............. B65D 2588/74; B65D 90/028; B60H 1/00014; B60H 1/3232; F25D 11/003; F25D 17/08; F25D 2700/00; F25D 29/003; F25D 2700/14
See application file for complete search history.

(56) References Cited

U.S. PATENT DOCUMENTS

| | | | |
|---|---|---|---|
| 5,228,313 | A | 7/1993 | Okamoto et al. |
| 5,507,157 | A | 4/1996 | Mase et al. |
| 6,615,908 | B1 | 9/2003 | Bosher et al. |
| 2003/0101742 | A1 | 6/2003 | Norelius et al. |
| 2009/0293524 | A1* | 12/2009 | Vezina ................ B65D 90/004 165/41 |
| 2014/0338374 | A1* | 11/2014 | Cresswell ............. F25D 23/006 62/89 |
| 2018/0328643 | A1* | 11/2018 | Eddy .................... F25D 11/003 |

FOREIGN PATENT DOCUMENTS

| | | | | |
|---|---|---|---|---|
| JP | H06194024 | A | | 7/1994 |
| JP | 07012449 | | | 1/1995 |
| KR | 20160074788 | A | * | 6/2016 ............ B65D 90/00 |
| WO | WO-9314359 | A1 | | 7/1993 |

OTHER PUBLICATIONS

International Search Report & Written Opinion for Application No. PCT/SE2021/050956 mailed Nov. 5, 2021.
Extended European Search Report for Application No. 21876091.6 dated Sep. 30, 2024, 5 pages.

* cited by examiner

TEMPERATURE-CONTROLLED TRANSPORT CONTAINER AND A METHOD FOR CONTROLLING CONDITIONS IN SUCH CONTAINER

TECHNICAL FIELD

The proposed technology generally relates to refrigeration systems for temperature-controlled transport containers, and more specifically to a refrigeration system with reduced risk for frost formation and a method for operating such a refrigeration system.

BACKGROUND

Many pharmaceutical companies are today using air transportation to ship temperature sensitive medicals to destinations around the world. The shipments are often governed under regulatory demands by laws in different countries and stipulate control of the temperature during the entire shipment. A common demand is to keep the shipment temperature within 2-8° C. Goods like vaccines and insulin are two common medicals that require a strict temperature of 2-8° C. during the whole shipment to its destination. Since the value of each shipment can be very high, mishaps such as flight delays, cancellations and delays in customs extend the total shipment time above what is anticipated. Consequently, the increased shipment time put increased demands on the shipping solution, also dependent on various outside weather and/or climate with respect to temperature and humidity.

There are different shipment solutions and among them specially designed containers for air freight (referred to ULDs, Unit Load Devices in the aviation industry). In refrigeration applications different cooling systems are used for keeping temperature-sensitive goods cold inside a closed space/compartment with insulation. One of the technologies to keep the cargo cool is to use a battery driven refrigeration system. A common usage of a refrigeration system is to pass the air in the cargo space through a heat exchanger or evaporator to cool down the air, and circulate the cooled air back into the cargo space to keep the cargo within a set temperature range. The air inside a cargo space is heated by infiltration through the wall insulation if the ambient air outside the container is warmer. Also, each time the door to the cargo space is opened, warmer air flows in from the outside. In an application with a non-hermetically enclosed cargo space, air will also flow in from the outside as an effect of the difference in density. The air from the outside is likely to contain higher relative humidity than the air inside the cargo space since warmer air can contain more water.

In order to achieve heat exchange and cool the circulated air the heat exchanger needs to be cooler than the air to be cooled. Thus, the refrigeration system is required to maintain a slightly lower temperature than the desired temperature of the cargo, which means that, according to the example above with a shipment temperature of 2-8° C., the refrigerant in the refrigeration system needs to be close to 0° C. or sub-zero in order to have a thermal transfer with the air in the cargo space. However, when the temperature is zero degrees Celsius or below, water from the humid air forms ice crystals/frost on the surface of the heat exchanger. The phase shift occurs on cold surfaces with icing as a consequence. Since ice has a lower thermal conductivity coefficient than most metal surfaces (which the heat exchanger is usually made of), the heat exchanger loses in capacity due to the ice on the surfaces and there is a risk that it completely freezes over. Over time, the built-up ice in the refrigeration unit will effectively block the air flow in the air flow path and degrade the cooling capacity of the refrigeration system to such extent that the cooling function is lost. Then the temperature needs to be raised in the refrigeration unit in order to melt the ice, which of course may also affect the temperature of the cargo.

To counter the problem with ice/frost formation it is possible to lower the temperature difference between the air and the heat exchanger. Another solution would be to increase the interaction area between the air in the cargo space and the heat exchanger. However, both methods are problematic if a temperature very close to or below zero is to be maintained.

A solution to challenge the problem with frost build up as discussed in the patent application WO9314359 is to have a separate airtight and moisture-proof cooling unit outside and contiguous of one or several walls around the cargo bay. The patent recognizes the benefit of a separate air circuit in order to prevent dehydration in the cargo space. However, the patent does not solve the problem with frost build up since there is still water in the air inside the separate air circuit. Also, the patent requires an airtight and moisture-proof design which is difficult and expensive to accomplish in large structures such as trucks and containers.

Since air is easy to use it is often used as a cooling medium. In an application for airborne equipment it would also be possible to place a cooling loop with HydroFluoro-Carbons (HFC) cooling medium from the refrigeration unit directly in the walls of a cargo container, but due to the rough handling of containers in air transport there is an increased risk of leaking. Furthermore, a system with a long cooling loop increases the demand for cooling medium in the system.

Therefore, there is a need for a solution that prevents frost formation in the refrigeration system.

SUMMARY

It is an object to provide a refrigeration system for a temperature-controlled transport container with reduced risk for frost formation, and a method for operating such a refrigeration system.

An aspect of the present technology relates to a temperature-controlled transport container having a cargo space for accommodating temperature-sensitive goods and a refrigeration system. The refrigeration system comprises a closed air circuit, separate from the cargo space and located outside of and contiguous with at least one wall of the cargo space. The refrigeration system further comprises at least one refrigeration unit configured to cool air in the closed air circuit. The refrigeration system also comprises a pressurizing unit for establishing a pressure difference between the closed air circuit and the ambient environment outside of, but in a vicinity of, the temperature-controlled transport container. The pressure difference is a higher pressure in the closed air circuit than in the ambient environment.

Another aspect of the present technology relates to a method for controlling climate conditions in a temperature-controlled transport container having a cargo space. Air in a closed air circuit is cooled. The closed air circuit is separate from the cargo space and is located outside of and contiguous with at least one wall of the cargo space. A pressure difference is established between the closed air circuit and an ambient environment outside of, but in a vicinity of, the transport container. The pressure difference is a higher pressure in the closed air circuit than in the ambient environment.

Some advantages of the proposed technology are:
Air, which is easy to use and handle, can be used as a cooling medium.
There is a minimal need for de-frosting of the heat exchanger. De-frosting is counterproductive from an efficiency perspective when running the application on battery.
The solution does not require a completely airtight or moisture-proof design.
Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Although the present invention is mainly described in the context of air cargo containers, it may also be applicable to other types of containers where there is a need for controlling the temperature inside the container.

As described above, there is a need for a solution that prevents frost formation in a refrigeration system for a temperature-controlled transport container since previous solutions all have their disadvantages.

The present invention solves the problem mainly before any frost build up occurs and does not require a entirely airtight or moisture-proof design. The solution is based on a separate closed air circuit with one or more refrigeration units comprising a heat exchanger or an evaporator cooling the air flow. An evaporator is specifically used to define the evaporation transition in the refrigeration system while a heat exchanger can define both condensation and evaporation transitions. The closed air circuit is provided separate from the cargo space, i.e. located outside of and contiguous with at least one wall of the cargo space. The air circuit is operated at a pressure that is different compared to ambient atmospheric pressure. This pressure difference controls the direction of any air penetrating the walls of the temperature-controlled transport container. If the closed air circuit is given a higher pressure than the ambient pressure, this prevents infiltration of ambient air, which can be useful e.g. when the ambient air has a high humidity. If the closed air circuit is given a lower pressure than the ambient pressure, this instead facilitates infiltration of ambient air, which can be useful e.g. when the ambient air has a low humidity, which for instance can be the case during flight transports.

In cases where the walls between the closed air circuit and the cargo space are not completely airtight, the pressure in the closed air circuit may also be used to influence the conditions within the cargo space. A higher pressure in the closed air circuit than in the cargo space will lead to a gradual infiltration of air into the cargo space. A lower pressure in the closed air circuit than in the cargo space will lead to a gradual exfiltration of air out from the cargo space. This may be utilized e.g. for regulating humidity levels within the cargo space.

Preferably, the air circuit is connected to one or more de-humidification devices to remove water vapor from the air in the air circuit. The de-humidification device can in certain embodiments be integrated with the refrigeration system. However, due to the approach of utilizing pressure differences within the temperature-controlled transport container, the need for operating the de-humidification device is significantly reduced.

Figure 1:
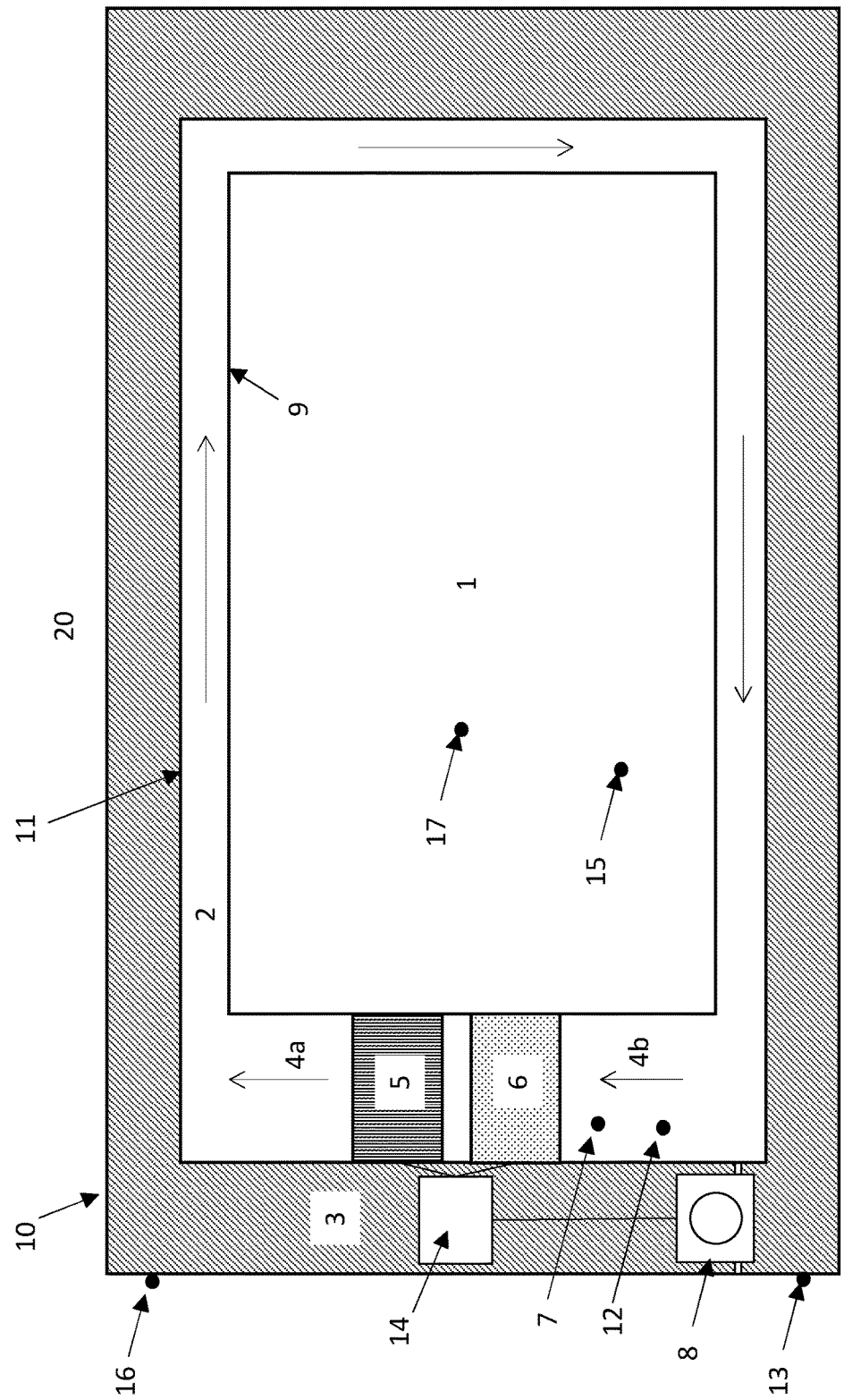
FIG. 1 is a schematic illustration of an embodiment of a temperature-controlled container.

FIG. 1 is a schematic diagram illustrating a temperature-controlled transport container 10 according to an example embodiment of the invention. The temperature-controlled transport container 10 comprises a cargo space 1 capable of accommodating temperature-sensitive goods.

The temperature-controlled transport container 10 further comprises a refrigeration system. As schematically illustrated in FIG. 1, as a part of the refrigeration system, an airflow 4a, 4b is guided in a closed air circuit 2 or channel system surrounding the cargo space 1 in the temperature-controlled transport container 10 container 10 and being contiguous with at least one wall 9 of the cargo space 1. Heat from the cargo space 1 can then be transported through the wall 9 and be cooled away by the airflow. By other words, as the name indicates, the airflow 4a, 4b in the closed air circuit 2 is separated from the air volume of the cargo space 1 and the air is returned. Even though the dominating part of the air is permanently circulated or at least present in the closed air circuit 2, the closed air circuit 2 does not necessarily be hermetically sealed from the cargo space or from the surroundings. Minor leakages may be present.

The air in the closed air circuit 2 passes through at least one refrigeration unit that comprises e.g. an evaporator or a heat exchanger, which cools down the air in the air circuit 2. Since the air circuit 2 is closed and separated from the cargo space 1, new humid air is prevented from entering into the air circuit during operation. For instance, when the door to the cargo space is opened, only the air within the cargo space 1 is affected, but not the air in the air circuit 2.

In order to prevent exchange of air into or out from the closed air circuit 2 from/to the ambient environment 20 outside of the container 10 and optionally also exchange to/from the cargo space 1, the air circuit 2 is under such circumstances operated at a pressure difference relative to the ambient air pressure. Therefore, the refrigeration system also comprises a pressurizing unit 8 for establishing a pressure difference between the closed air circuit 2 and the ambient air pressure, i.e. the pressure of the ambient environment 20 outside of, but in a vicinity of, the temperature-controlled transport container 10. This can be implemented by means of different fans or air pumps. This pressurizing unit 8 can be operated to achieve an original pressure difference in connection with loading of the cargo space. The pressurizing unit 8 can also be utilized to compensate for leakages from/to the closed air circuit 2, or for changing the pressure conditions in the closed air circuit 2, e.g. as a response to changing conditions in the cargo space 1 and/or the surroundings 20, as will be further discussed below. However, the provision of the pressurizing unit 8 enables operation routines that may reduce the amount of humidity within the closed air circuit 2 considerably.

Since the pressure difference between the air circuit 2 and the surroundings will cause air to leak out to or infiltrate from the environment, depending on how well the air circuit 2 is sealed, there is typically as need of maintaining the pressure difference within the air circuit. To this end, in one embodiment, temperature-controlled transport container 10 further comprises an air-circuit pressure gauge 12. This air-circuit pressure gauge 12 is configured to measure an air pressure inside the closed air circuit. This measured air-circuit pressure can then be used for optimizing an operation of e.g. the refrigeration unit(s) 5. The measured air-circuit pressure can also be utilized as an input for controlling the pressurizing unit 8, e.g. initiating recovery of the pressure difference. In other words, at least one of the pressurizing unit 8 and the refrigeration unit(s) is configured to base its operation on the measured air-circuit pressure.

However, the pressure difference also depends on the ambient pressure. If the temperature-controlled transport container 10 is transported in normal atmospheric pressures, e.g. when being transported by trucks, trains or ships, there is a general knowledge of an approximate air pressure outside the temperature-controlled transport container 10. However, if the temperature-controlled transport container 10 is transported on an airplane, the ambient air pressure can be significantly reduced. This may lead to an extensive leakage of air out from the closed air circuit 2. Furthermore, since the ambient humidity during flight transports may be very low, there might even be a wish to introduce ambient air into the closed air circuit to reduce the humidity therein. However, when the flight is ended, and the ambient temperature as well as humidity increases, the original conditions may be requested to be restored.

From this, it is understood that it would be beneficial for the refrigeration system to also have access to a measure of the ambient air pressure. A difference between the air circuit pressure and the ambient pressure is thereby directly available. Therefore, in one preferred embodiment, the temperature-controlled transport container 10 further comprises an ambient pressure gauge 13. The ambient pressure gauge is configured to measure an air pressure outside of, but in a vicinity of, the temperature-controlled transport container 10. At least one of the pressurizing unit and the refrigeration unit(s) is configured to further base its operation on the measured ambient pressure.

Since any pressure difference between the closed air circuit 2 and the cargo space 1 may cause exchange of air there between by e.g. leakage, it is also advantageous to also have knowledge of the pressure within the cargo space 1. In one preferred embodiment, the temperature-controlled transport container 10 further comprises a cargo space pressure gauge 15 configured to measure a pressure inside the cargo space 1. Thereby at least one of the pressurizing unit 8 and the refrigeration unit(s) 5 is configured to further base its operation on the measured cargo space pressure.

Since one of the main purposes with the present technology is to reduce the risk for frost formation, humidity is of course of great interest. In a preferred embodiment, the temperature-controlled transport container 10 further comprises an air-circuit humidity sensor 7. This air-circuit humidity sensor 7 is configured to measure the humidity inside the closed air circuit 2. This additional knowledge of the humidity within the closed air circuit 2 makes it possible to take actions if necessary. Therefore, at least one of the pressurizing unit 8 and the refrigeration unit(s) 5 is configured to further base its operation on the measured air-circuit humidity.

Since different actions of the pressurizing unit 8 and/or the refrigeration unit(s) 5 may involve the relation with the ambient environment and/or the cargo space, additional information about the humidity situation also in these volumes may be useful. Therefore, in one embodiment, the temperature-controlled transport container 10 further comprises an ambient humidity sensor 16 configured to measure a humidity outside of, but in a vicinity of, the temperature-controlled transport container 10. Thereby at least one of the pressurizing unit 8 and the refrigeration unit(s) 5 is configured to further base its operation on the measured ambient humidity.

Also, in one embodiment, the temperature-controlled transport container 10 further comprises a cargo space humidity sensor 17 configured to measure a humidity inside said cargo space 1. At least one of the pressurizing unit 8 and the refrigeration unit(s) 5 is configured to further base its operation on the measured cargo space humidity.

Based on measured pressures and humidities, different action can be made by use of the refrigeration unit(s) 5 and the pressurizing unit 8. As indicated above, during flight transports, the ambient air may be both of a low pressure and of a low humidity. By operating the pressurizing unit 8 to reduce the pressure within the closed air circuit 2 even lower or to operate the pressurizing unit 8 for actively exchanging the air inside the closed air circuit 2 for ambient air, the amount of water within the closed air circuit 2 can be reduced.

Moreover, if there are required restrictions on pressures and humidity within the cargo space, information about measured values of pressure and humidity can be used for assisting in such operations. The pressure difference between the closed air circuit 2 and the cargo space 1 will determine in which direction any leakage of air will be directed. If the humidity in the closed air circuit 2 is higher than in the cargo space 1, and a higher humidity is requested in the cargo space 1, the pressure in the closed air circuit 2 may be increased above the level in the cargo space 1, which will cause a leakage of humid air into the cargo space 1. If instead the humidity level within the cargo space 1 is requested to be maintained, the pressure within the closed air circuit 2 may be decreased to approximately the same level as in the cargo space 1, which will reduce any leakage of humid air into the cargo space 1. Analogue control measured can be taken if the opposite humidity relations are existing.

In many situations, the action of the refrigeration unit(s) 5 and the pressurizing unit 8 is sufficient to maintain the risk for frost formation low and optionally also for controlling the conditions within the cargo space 1. However, in some applications, the humidity load may be too large anyway. Therefore, in one preferred embodiment, the refrigeration system further comprises a dehumidification device 6. This dehumidification device 6 is configured to remove water vapor from the closed air circuit 2.

If information from any pressure gauges and/or humidity sensors is available, such information is preferably used for controlling the operation of the dehumidification device 6. In other words, in a preferred embodiment, the dehumidification device 6 is configured to base its operation on at least one of the measured air-circuit pressure, the measured ambient pressure, the measured cargo space pressure, the measured air-circuit humidity, the measured ambient humidity and the measured cargo space humidity.

The operation of the temperature-controlled transport container, as a whole, is a cooperation between one or more refrigeration units 5, a pressurizing unit 8 and optionally a dehumidification device 6. To optimize such cooperation, it is advantageous to have a control unit 14 handling all collection of measurements and making the necessary decisions about which measures to take. The control unit 14 is therefore in such an embodiment communicationally connected to all pressure gauges and humidity sensors, if any, as well as to the refrigeration units 5, the pressurizing unit 8 and optionally to the dehumidification device 6.

In other words, in one embodiment, the refrigeration system further comprises a control unit 14 connected to the pressurizing unit 8 and the refrigeration unit(s) 5, and to pressure gauges 12, 13, 15 and humidity sensors 7, 16, 17, if any. The control unit 14 is configured to control the operation of the pressurizing unit 8 and the refrigeration unit 5. In one preferred embodiment, the control unit 14 is further connected to the dehumidification device 6. The control unit 14 is configured to control the operation of the dehumidification device 6.

The outer walls 11 of the air circuit 2 facing the ambient environment 20 outside of the container 10 may preferably be thermally insulated. Thus, in one embodiment a thermal insulation 3 is provided in the outer walls 11. The chilled air in the air circuit 2 will transport away remaining infiltration heat from the outside which enable the walls 9 of the air circuit 2 facing the cargo space 1 to keep the cargo space refrigerated. Preferably, the wall 9 between the air circuit 2 and the cargo space 1 comprise heat-conducting material, preferably highly heat-conducting material, thereby enabling an efficient heat transfer between the air circuit 2 and the cargo space 1. Preferably, the wall 9 has an average heat conductivity of at least 50 W/m·K, more preferably at least 150 W/m·K.

In other words, in one embodiment, the walls 9 between the closed air circuit 2 and the cargo space 1 comprise heat-conducting material. Furthermore, outer walls 11 between the air circuit 2 and the ambient environment 20 are provided with a thermal insulation 3. This enables heat transfer between the air circuit 2 and the cargo space 1 but mitigates heat transfer between the air circuit 2 and the ambient environment 20.

The air circuit 2 transporting the chilled air has preferably a much smaller volume than the volume of the cargo space 1. This leads to that the air volume that comes into contact with the refrigeration unit 5 can be kept small. This in turn means that the amount of water vapour contained in the air that can condense into water and cause ice/frost formation at zero temperature, is also much smaller in the air circuit 2 than in prior-art designs. In particular, in one embodiment, the volume of the air circuit 2 should preferably be less than 50% of the total air volume used for cooling the cargo area.

Thus, the refrigerated space in the cargo container is cooled by indirect cold from a refrigeration system where air is used as a cooling medium and the refrigeration system is separate in relation to the refrigerated space. Furthermore, the water vapour in the cooling air flowing in the refrigeration system is preferably removed from the refrigeration system before the evaporator or heat exchanger in the refrigeration system reaches a temperature below the freezing temperature for water. The refrigeration system is also operated at a pressure difference to prevent unwanted air infiltration into or out from the refrigeration system. Frost formation in the refrigeration system can thereby be prevented.

Consequently, a method for controlling a temperature in a transport container is also disclosed. An embodiment of the method is schematically illustrated in the flow diagram in FIG. 2. As described above, the temperature-controlled transport container comprises a cargo space. In step S20, air is cooled in the closed air circuit. As mentioned above, the closed air circuit is separate from the cargo space and located outside of and contiguous with at least one wall of the cargo space This cooling is performed in order to maintain an operating temperature or temperature schedule and is typically based on measurements of the temperature within the cargo space.

In step S30, a pressure difference between the closed air circuit and an ambient environment outside of, but in a vicinity of, the temperature-controlled transport container. This pressure difference is preferably maintained or controlled in other ways throughout operation of the refrigeration system.

As discussed above, it is preferable to base the operations on measured quantities. Therefore, in a preferred embodiment, measurements are performed, as indicated by step S1.

Figure 3:
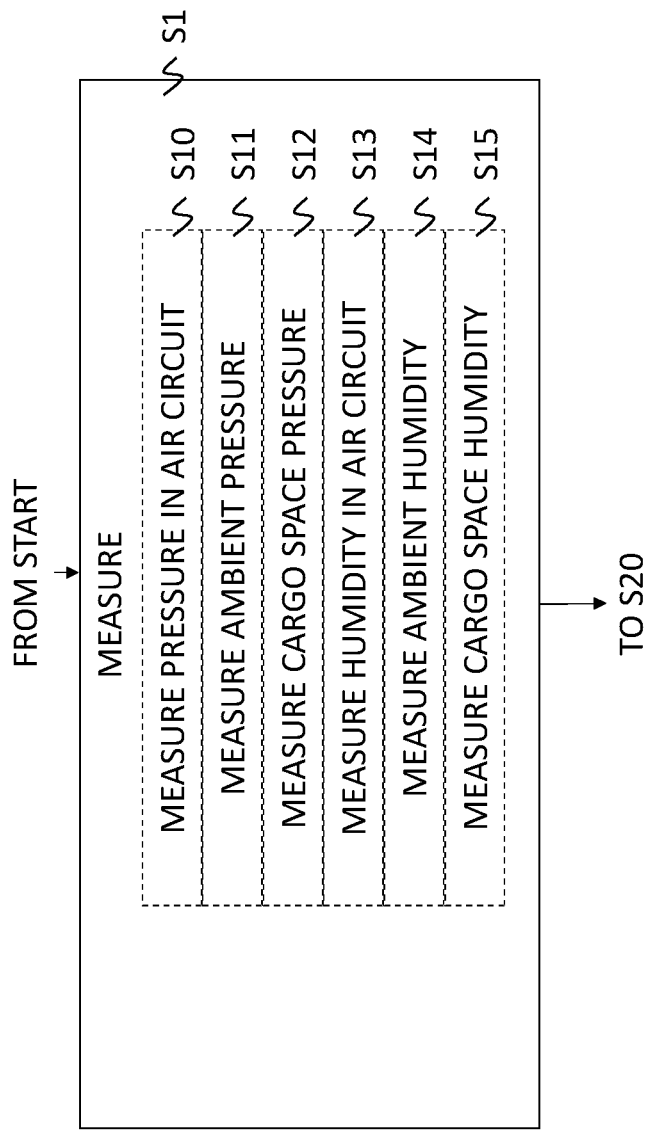
FIG. 3 is a flow diagram illustrating one embodiment of step S1 of FIG. 2.

In FIG. 3, details of preferred embodiments of step S1 are illustrated. In step S10, an air-circuit pressure is measured. The air-circuit pressure is a pressure inside the closed air circuit. In step S11, an ambient pressure is measured. The ambient pressure is a pressure in the ambient environment outside of the transport container, but in a vicinity of the container. In step S12, a cargo space pressure is measured. The cargo space pressure is a pressure within the cargo space. In step S13, an air-circuit humidity is measured. The air-circuit humidity is a humidity inside said closed air circuit. In step S14, an ambient humidity is measured. The ambient humidity is a humidity in the ambient environment outside of the transport container, but in a vicinity of the same. In step S15, a cargo space humidity is measured. The cargo space humidity is a humidity within the cargo space.

In different embodiments, different sets of the measurements of steps S10-S15 can be utilized. Preferably, when step S11 and/or S12 is performed, also step S10 is performed. Likewise, preferably, when step S15 and/or S14 is performed, also step S13 is performed.

Returning to FIG. 2, steps S20 and S30 are, as indicated by the steps S25 and S35, preferably based on the measurements provided in step S1. In more detail, at least one of the cooling S20 of air and the establishing S30 of a pressure difference is controlled S25, S35 based on measurements obtained by at least one of the measuring of the air-circuit pressure, the ambient pressure, the cargo space pressure, the air-circuit humidity, the ambient humidity and the cargo space humidity.

As discussed further above, different options for controlling the pressures, optional dehumidification, operation of auxiliary refrigeration units and if necessary de-frosting can be made. As seen from FIG. 2, such steps are typically at least partly integrated with each other. The control of the temperature-controlled transport container is therefore typically a composed control involving several different devices and aspects.

The steps S20 and S30 do indeed open possibilities to limit the humidity within the closed air circuit. However, in certain applications or under certain circumstances, it might be necessary with dehumidification. This can, as indicated above, in some embodiments at least partly be performed in cooperation with the pressurizing efforts. In one preferred embodiment, the method for controlling climate conditions in the temperature-controlled transport container further comprises step S40, in which the air in the closed air circuit is dehumidified. In a further preferred embodiment this is performed by directing the air through a dehumidification device. In another embodiment, the dehumidifying of the air in the closed air circuit may be performed in a refrigeration unit.

In a further preferred embodiment, the dehumidifying of step S40 is controlled in step S45 based on measurements obtained by at least one of the measuring (S10-S15, FIG. 3) of the air-circuit pressure, the ambient pressure, the cargo space pressure, the air-circuit humidity, the ambient humidity and the cargo space humidity. The dehumidification may of course be performed by a dedicated equipment. However, it may also be the result of other actions, e.g. pressure-related actions and/or refrigeration unit operations.

In step S50 an air passage is opened between the closed air-circuit and the ambient environment. This is typically performed by opening a valve in the outer wall. Thereby a difference in pressure between the ambient environment and the closed air-circuit is reduced. This may e.g. be of interest if the ambient pressure has decreased and there is an advantage of reducing also the air-circuit pressure, e.g. for influencing a leak rate from the cargo space. If this leak of air comes from a dry cargo space, it might assist in dehumidifying the air in the closed air circuit.

In step S52, an air passage is opened between the closed air-circuit and the cargo space. This is typically performed by opening a valve in the inner wall. Thereby, a difference in pressure and humidity between the cargo space and the closed air-circuit is reduced. If the cargo space is drier than the air in the closed air circuit, this action assists in dehumidifying the air in the closed air circuit In the two steps described above, an active channel between different volumes of air is created, thereby influencing the pressures. However, an airflow in the form of leaks can also be regulated by instead changing the pressure in the closed air circuit.

Figure 4:
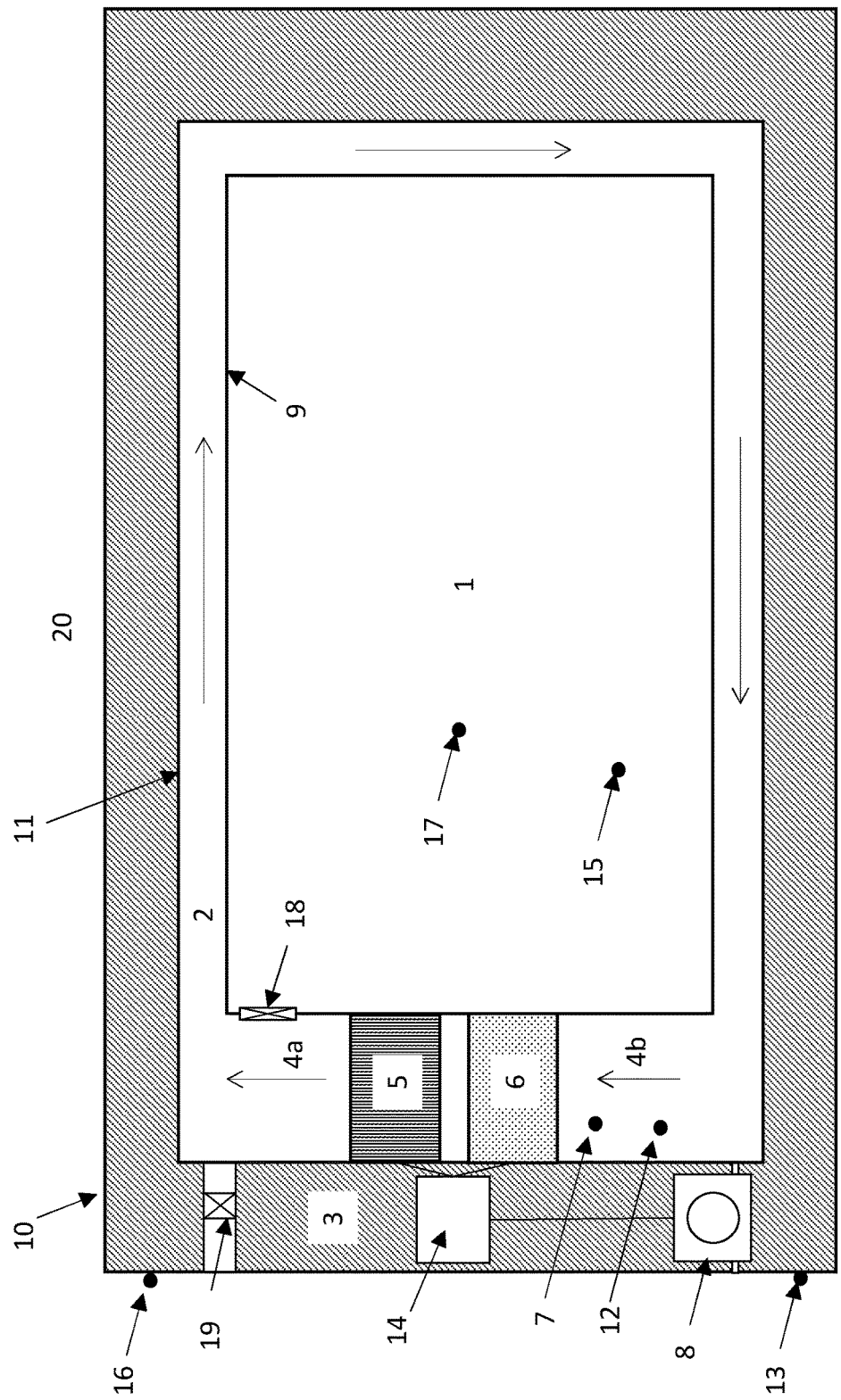
FIG. 4 is a schematic illustration of another embodiment of a temperature-controlled container.

FIG. 4 illustrates an embodiment of a temperature-controlled transport container 10, having a controllable outer valve 19 connecting the closed air circuit 2 and the ambient environment 20. By operating this valve, a connection between the closed air circuit 2 and the ambient environment 20 may be opened. This connection can be fully opened or opened with a flow restriction, which enables a gradual pressure equalization.

In the embodiment of FIG. 4, the temperature-controlled transport container 10 also comprises a controllable inner valve 18 connecting the closed air circuit 2 and the cargo space 1. By operating this valve, a connection between the closed air circuit 2 and the cargo space 1 may be opened. This connection can be fully opened or opened with a flow restriction, which enables a gradual pressure equalization.

Returning to FIG. 2, in step S54, as a part of the step of establishing S30 a pressure difference, comprises controlling of a pressure difference between the closed air-circuit and the ambient environment for regulating a leakage rate through a wall separating the ambient environment and the closed air-circuit. An increased pressure in the closed air-circuit will increase an outflow of air towards the ambient environment or decrease an inflow of air from the ambient environment.

In step S56, a pressure difference between the closed air-circuit and the cargo space is controlled for regulating a leakage rate through a wall separating the cargo space and the closed air-circuit. This may also influence the pressure difference between the closed air circuit and the ambient environment. An increased pressure in the closed air-circuit will increase an outflow of air towards the cargo space or decrease an inflow of air from the cargo space. This can be useful, when one wishes to change the humidity in the cargo space.

At initialization, the temperature in the refrigeration system is typically set to dew point temperature, in order to condense humidity/water vapor in the closed air circuit into water. When water has been extracted from the air in the closed air circuit, reaching a sufficiently low predetermined humidity, the initialization continues with cooling down the refrigeration system to its desired, typically predetermined, operating temperature. This temperature is typically dependent on the requirements of the cargo transported in the cargo space. These steps are thus essentially initialization steps and thus not completely necessary for maintaining the main operation. These steps may also be exchanged e.g. for other initialization steps, e.g. where cold low-humidity air is provided directly into the air circuit.

Despite all measures taken for avoiding frost formation, there may anyway be occasions where frost will form. If frost formation is detected inside the closed air circuit, an optional step S70 of de-frosting the refrigeration system may be performed.

Figure 5:
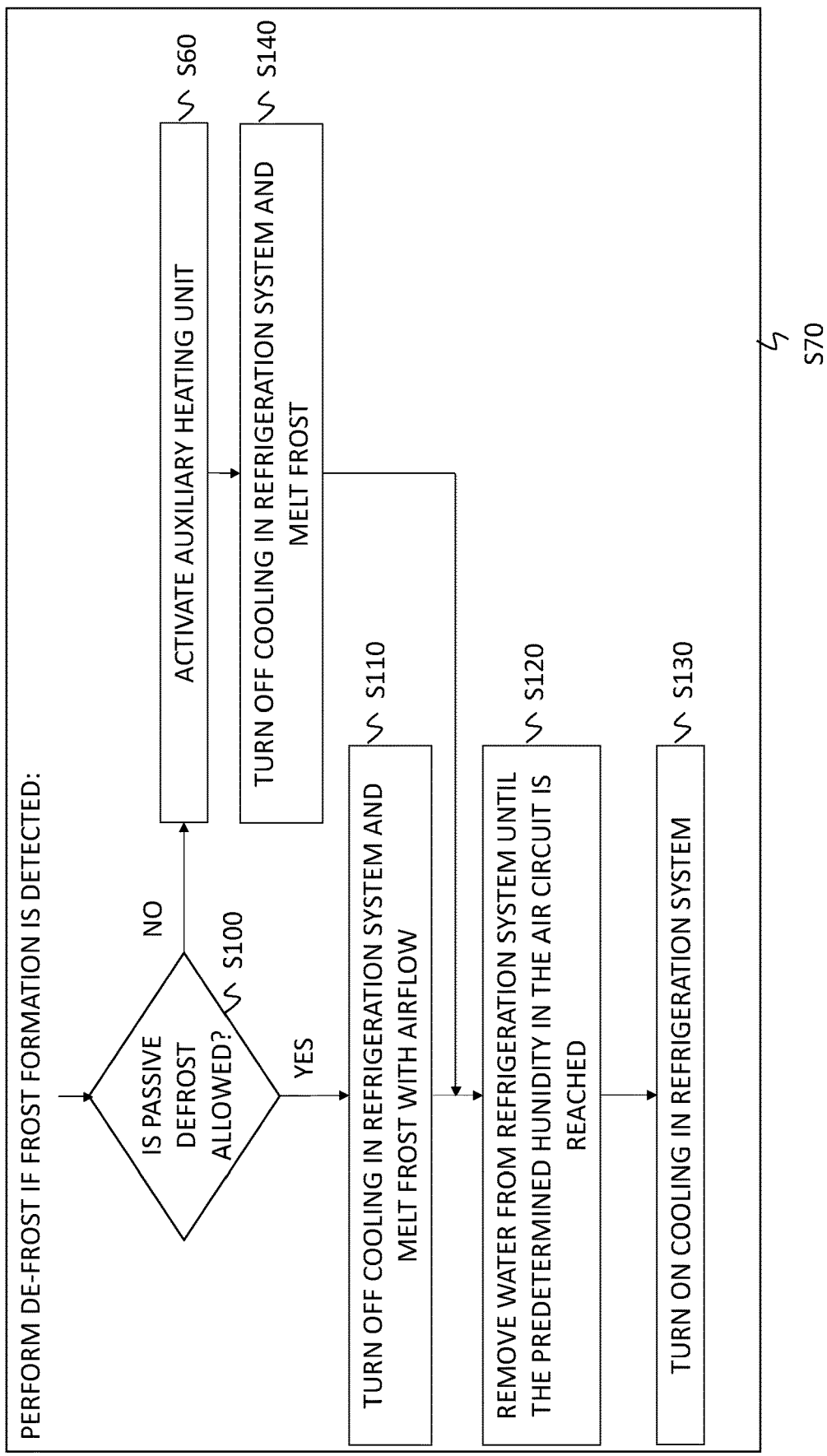
FIG. 5 is a flow diagram illustrating one embodiment of step S70 of FIG. 2.

The de-frosting step S70 may in different embodiment comprise several sub-steps, e.g. as is schematically illustrated in the embodiment of FIG. 5. First, it is checked in a step S100 if passive de-frosting is allowed, which depends on the stress/load of the refrigeration system, e.g. depending on ambient temperature. If this is true, i.e. passive de-frosting is allowed, the cooling in the refrigeration system is turned off in a step S110 and the frost is melted by an airflow from a fan driving the air that is present in the closed air circuit over the heat exchanger or evaporator in the refrigeration unit. The ice assimilates heat energy from the airflow causing a phase shift from ice to water. At the same time, the airflow is cooled, and thereby the omission of the refrigeration operation is at least partly compensated. Water is removed from the refrigeration system in a step S120 until the predetermined humidity in the air circuit is reached, i.e. that operational humidity conditions are met. This could be done by extracting the melted water directly at the heat exchanger or evaporator. Alternatively, the water could be allowed to evaporate into water vapor, which then is caught by a dehumidification device. The cooling is then turned on again in a step S130. The method then continues to the ordinary climate control steps illustrated in FIG. 2.

In a temperature-controlled transport container adapted for such operation, the refrigeration unit(s) comprises a fan and is configured to allow an operation mode where active refrigeration is stopped, but where said fan is operating causing an airflow that passes portions of said at least one refrigeration unit exposed for frost.

If the ambient temperature is too high to allow for passive de-frosting, i.e. the refrigeration system needs the cooling power from the refrigeration unit to maintain the temperature in the system, a rapid de-frost is done by heating the evaporator or heat exchanger directly to melt the frost, i.e. active de-frosting. In this case an auxiliary unit, providing heat, can be activated in a step S60. This auxiliary unit may be another unit of the refrigeration system locally heating the airflow in the vicinity of the refrigeration unit. Alternatively, the auxiliary unit can operate directly on the refrigeration unit e.g. by conducting electrical current through heating elements in mechanical parts being in contact with the evaporator or heat exchanger. The cooling in the refrigeration system is then turned off in a step S140 and the frost is melted e.g. by a the hot airflow from the auxiliary refrigeration unit or heat conduction from heating elements.

The method then continues with the step S120 of removing water from the refrigeration system, and the step S130 of turning the cooling system on again as described above.

Figure 2:
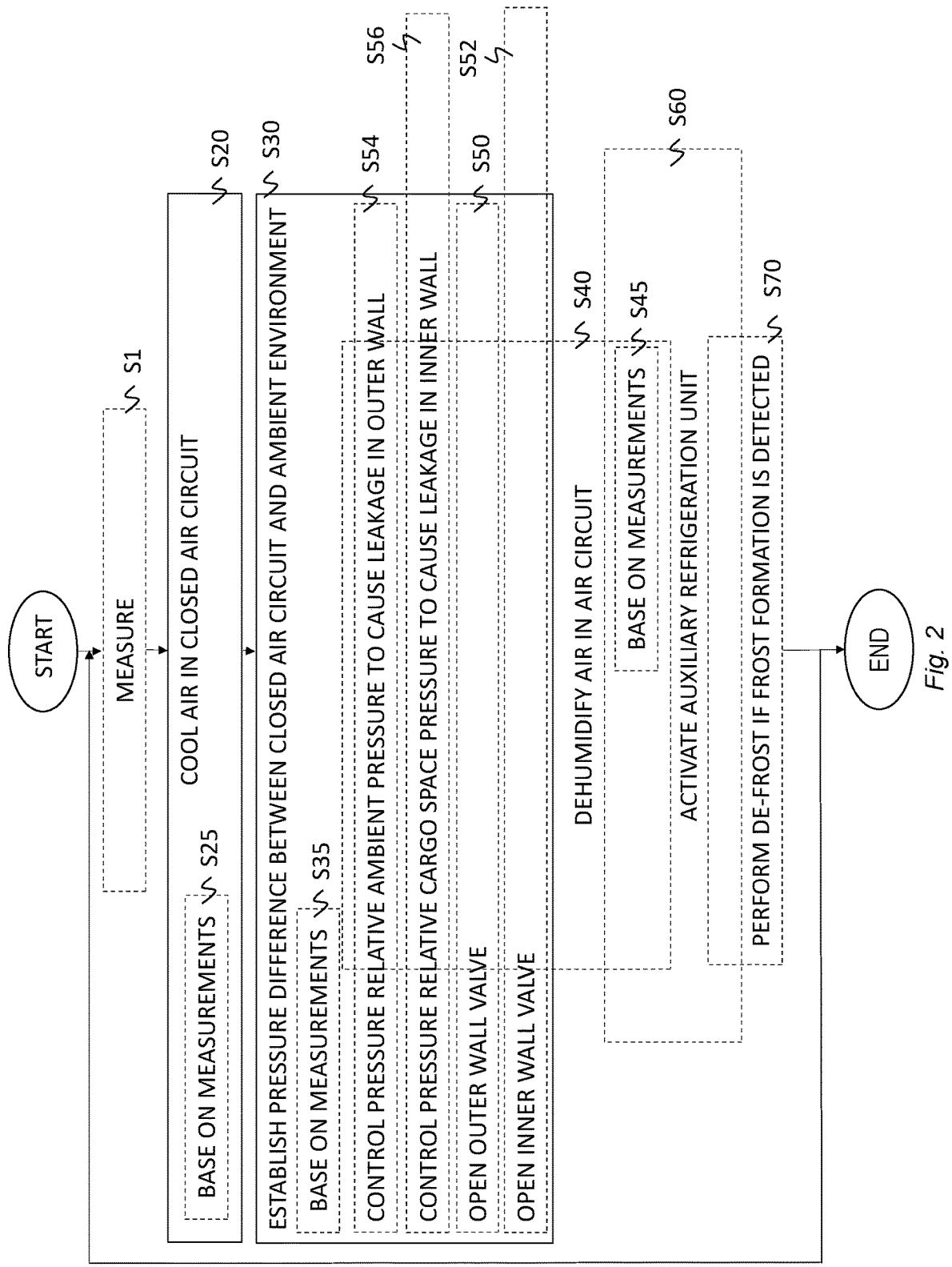
FIG. 2 is a schematic flow diagram of steps of an embodiment of a method for controlling climate conditions in a temperature-controlled transport container.
Figure 6:
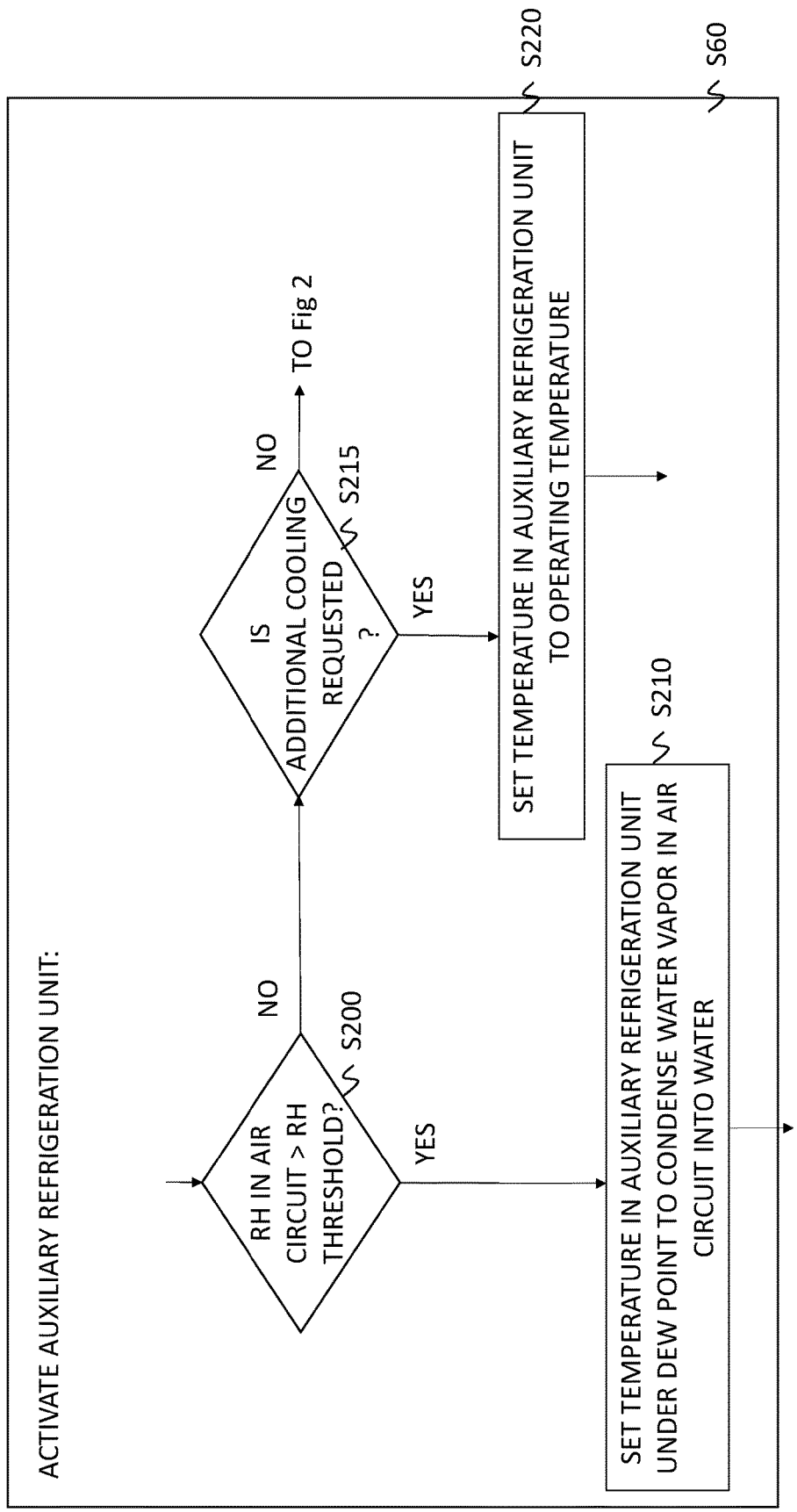
FIG. 6 is a flow diagram illustrating one embodiment of step S60 of FIG. 2.

If the refrigeration system has access to more than one refrigeration unit, this can be used not only for providing a higher cooling power, but also for assisting in frost prevention. Step S60 of activating an auxiliary refrigeration unit may therefore as indicated in FIG. 2 be considered as partly overlapping the step S50 of dehumidifying air in the air circuit. Step 60 may comprise several sub-steps, as is schematically illustrated in the embodiment of FIG. 6. First, in a step S200 it is checked if the relative humidity (RH) in the closed air circuit is above a predetermined threshold value. If this is true, a dehumidification cycle is initiated in the auxiliary refrigeration unit. In this case a step S210 is performed where the temperature in the auxiliary refrigeration unit is set to a temperature below the dew point of the air in the closed air circuit to condense water vapor from the air circuit into water.

In a particular embodiment the set temperature for the active refrigeration unit is set to a somewhat higher value, but still within an acceptable temperature range, whereas the temperature for the auxiliary refrigeration unit is set to a somewhat lower value. In this way, the auxiliary refrigeration unit will operate as a dehumidifying equipment operating in parallel to the active refrigeration unit.

If, in step S200, the RH in the air circuit is found to be below the predetermined RH threshold, the auxiliary refrigeration unit may be free to use as an additional resource of cooling. In step S215, it is determined whether the system requests additional cooling effect. If that is the case, the process continues to step S220, where a setting of the auxiliary refrigeration unit to operating temperature is performed. The process then continues to the steps in FIG. 2, where the auxiliary refrigeration unit can be used in Step S40 for maintaining the operation temperature.

With this method, water can be removed from the air in the closed air circuit and frost formation in the refrigeration system can thereby be prevented.

Considering the devices of a temperature-controlled transport container adapted for these steps, the refrigeration system comprises at least two refrigeration units, configured for individual operation.

When the refrigeration units are used for defrosting, the refrigeration units further comprise a heating arrangement and a fan configured to direct air heated by the heating arrangement towards portions exposed for frost of a neighboring refrigeration unit.

Some advantages of the proposed technology are:
Air, which is easy to use and handle, can be used as a cooling medium.
There is a minimal need for de-frosting of the heat exchanger. De-frosting is counterproductive from an efficiency perspective when running the application on battery.
The solution does not require an airtight or moisture-proof design.

The embodiments described above are merely given as examples, and it should be understood that the proposed technology is not limited thereto. It will be understood by those skilled in the art that various modifications, combinations and changes can be made to the embodiments without departing from the present scope as defined by the appended claims. In particular, different part solutions in the different embodiments can be combined in other configurations, where technically possible.

The invention claimed is:
1. A temperature-controlled transport container, said temperature-controlled transport container comprising a cargo space for accommodating temperature-sensitive goods and a refrigeration system, said refrigeration system comprising:
a closed air circuit, separate from said cargo space, located outside of and contiguous with at least one wall of said cargo space;
at least one refrigeration unit configured to cool air in said closed air circuit; and
a pressurizing unit for establishing a pressure difference between said closed air circuit and the ambient environment outside of, but in a vicinity of, said temperature-controlled transport container,
said pressure difference being a higher pressure in said closed air circuit than in the ambient environment.

2. The temperature-controlled transport container according to claim 1, further comprising an air-circuit pressure gauge configured to measure an air pressure inside said closed air circuit, whereby at least one of said pressurizing unit and said at least one refrigeration unit is configured to base its operation on said measured air-circuit pressure.

3. The temperature-controlled transport container according to claim 2, further comprising an ambient pressure gauge configured to measure an air pressure outside of, but in a vicinity of, said temperature-controlled transport container, whereby at least one of said pressurizing unit and said at least one refrigeration unit is configured to further base its operation on said measured ambient pressure.

4. The temperature-controlled transport container according to claim 2, further comprising a cargo space pressure gauge configured to measure a pressure inside said cargo space, whereby at least one of said pressurizing unit and said at least one refrigeration unit is configured to further base its operation on said measured cargo space pressure.

5. The temperature-controlled transport container according to claim 1, further comprising an air-circuit humidity sensor configured to measure the humidity inside said closed air circuit, whereby at least one of said pressurizing unit and said at least one refrigeration unit is configured to further base its operation on said measured air-circuit humidity.

6. The temperature-controlled transport container according to claim 5, further comprising an ambient humidity sensor configured to measure a humidity outside of, but in a vicinity of, said temperature-controlled transport container, whereby at least one of said pressurizing unit and said at least one refrigeration unit is configured to further base its operation on said measured ambient humidity.

7. The temperature-controlled transport container according to claim 5, further comprising a cargo space humidity sensor configured to measure a humidity inside said cargo space, whereby at least one of said pressurizing unit and said at least one refrigeration unit is configured to further base its operation on said measured cargo space humidity.

8. The temperature-controlled transport container according to claim 1, wherein said refrigeration system further comprises a dehumidification device configured to remove water vapor from said closed air circuit.

9. The temperature-controlled transport container according to claim 1, wherein walls between said closed air circuit and said cargo space comprise heat-conducting material, and outer walls between said air circuit and said ambient environment are provided with a thermal insulation, thereby enabling heat transfer between said air circuit and said cargo space but mitigating heat transfer between said air circuit and said ambient environment.

10. The temperature-controlled transport container according to claim 1, wherein said at least one refrigeration unit comprises a fan and is configured to allow an operation mode where active refrigeration is stopped, but where said fan is operating causing an airflow that passes portions of said at least one refrigeration unit exposed for frost.

11. The temperature-controlled transport container according to claim 1, wherein the refrigeration system comprises at least two refrigeration units, configured for individual operation, whereby the refrigeration units further comprise a heating arrangement and a fan configured to direct air heated by said heating arrangement towards portions exposed for frost of a neighboring refrigeration unit.

12. A method for controlling climate conditions in a temperature-controlled transport container, said temperature-controlled transport container comprising a cargo space, the method comprising:
cooling air with a refrigeration system in a closed air circuit, said closed air circuit being separate from said cargo space and located outside of and contiguous with at least one wall of said cargo space; and
establishing by a pressurizing unit a pressure difference between said closed air circuit and an ambient environment outside of, but in a vicinity of, said temperature-controlled transport container,
said pressure difference being a higher pressure in said closed air circuit than in the ambient environment.

13. The method according to claim 12, wherein at least one of said cooling of air and said establishing of a pressure difference is controlled based on measurements obtained by at least one of measuring of air-circuit pressure, ambient pressure, cargo space pressure, air-circuit humidity, ambient humidity and cargo space humidity.

14. The method according to claim 12, comprising the further step of dehumidifying said air in said closed air circuit by a dehumidification device configured to remove water vapor from said closed air circuit.

15. The method according to claim 12, comprising the further step of opening an air passage between said closed air-circuit and said ambient environment, thereby reducing a difference in pressure between said ambient environment and said closed air-circuit.

16. The method according to claim 12, comprising the further step of opening an air passage between said closed air-circuit and said cargo space, thereby reducing a difference in pressure and humidity between said cargo space and said closed air-circuit.

17. The method according to claim 12, wherein the step of establishing a pressure difference comprises controlling a pressure difference between said closed air-circuit and said ambient environment for regulating a leakage rate through a wall separating said ambient environment and said closed air-circuit.

18. The method according to claim 12, wherein the step of establishing a pressure difference comprises controlling a pressure difference between said closed air-circuit and said cargo space for regulating a leakage rate through a wall separating said cargo space and said closed air-circuit.

19. The method according to claim 12, comprising the further step of de-frosting a refrigeration system performing said cooling of air if frost formation is detected in said closed air circuit.

20. The method according to claim 19, wherein said de-frosting comprises heating of air in said closed air-circuit and streaming back said heated air in an opposite direction towards portions of said refrigeration system exposed for frost.

* * * * *